US012661536B2

(12) United States Patent
Wolner et al.

(10) Patent No.: US 12,661,536 B2
(45) Date of Patent: Jun. 23, 2026

(54) SUSPENSION TRAUMA RELIEF STRAP ASSEMBLY FOR USE WITH A FULL BODY HARNESS

(71) Applicant: D B INDUSTRIES, LLC, Maplewood, MN (US)

(72) Inventors: J. Thomas Wolner, Red Wing, MN (US); Travis P. Betcher, Goodhue, MN (US)

(73) Assignee: D B Industries, LLC, Maplewood, MN (US)

( * ) Notice: Subject to any disclaimer, the term of this patent is extended or adjusted under 35 U.S.C. 154(b) by 449 days.

(21) Appl. No.: 18/094,830

(22) Filed: Jan. 9, 2023

(65) Prior Publication Data

US 2023/0158346 A1 May 25, 2023

Related U.S. Application Data

(63) Continuation of application No. 16/191,633, filed on Nov. 15, 2018, now Pat. No. 11,577,104, which is a continuation of application No. 14/535,102, filed on Nov. 6, 2014, now Pat. No. 11,058,905, which is a continuation of application No. 12/250,216, filed on Oct. 13, 2008, now Pat. No. 8,919,496, which is a continuation of application No. 11/184,549, filed on Jul. 19, 2005, now Pat. No. 8,061,481.

(Continued)

(51) Int. Cl.
*A62B 35/00* (2006.01)

(52) U.S. Cl.
CPC ...... *A62B 35/0006* (2013.01); *A62B 35/0018* (2013.01); *A62B 35/0025* (2013.01)

(58) Field of Classification Search
CPC ............ A62B 35/0031; A62B 35/0006; A62B 35/0018; A62B 35/0025; B64D 17/30; B64D 25/02; A63B 7/02; A63B 9/0062; A63B 2022/0033; A63B 2022/03525; A63G 9/00; A63G 9/02; A45F 3/26
See application file for complete search history.

(56) References Cited

U.S. PATENT DOCUMENTS

| | | |
|---|---|---|
| 119,997 A | 10/1871 | Rice |
| 276,730 A | 5/1883 | Sturtevant |

(Continued)

FOREIGN PATENT DOCUMENTS

| | | |
|---|---|---|
| DE | 2842008 A1 | 4/1980 |
| FR | 724519 A | 4/1932 |

(Continued)

*Primary Examiner* — Colleen M Chavchavadze
(74) *Attorney, Agent, or Firm* — Kenneth B. Wood

(57) ABSTRACT

A preferred embodiment suspension trauma relief strap assembly for use with a full body harness includes a pair of straps connectable in two configurations. The first configuration is formed by engaging a hook of one strap with one of a plurality of closed loop arrangements of the other strap to form a sling upon which a person donning the full body harness may stand. The second configuration is formed by engaging the hook of the one strap with one of the plurality of closed loop arrangements of the one strap and engaging the hook of the other strap with one of the plurality of closed loop arrangements of the other strap to form two slings upon which a person donning the full body harness may stand.

27 Claims, 8 Drawing Sheets

Related U.S. Application Data

(60) Provisional application No. 60/590,248, filed on Jul. 22, 2004.

(56) References Cited

U.S. PATENT DOCUMENTS

| | | | |
|---|---|---|---|
| 287,598 A | 10/1883 | Welsh | |
| 350,628 A | 10/1886 | Howes | |
| 416,550 A | 12/1889 | Betten | |
| 454,235 A | 6/1891 | Stut | |
| 529,794 A | 11/1894 | Jackson | |
| 661,175 A | 11/1900 | Haigh | |
| 666,896 A | 1/1901 | Essig | |
| 712,555 A | 11/1902 | Layland | |
| 1,349,513 A | 8/1920 | Koza | |
| 1,490,066 A | 4/1924 | Carr | |
| 1,547,529 A | 7/1925 | Stanton | |
| 1,618,273 A | 2/1927 | Davidson | |
| 2,078,146 A | 4/1937 | Blanc | |
| 2,879,990 A | 3/1959 | Eaton | |
| 2,979,028 A | 4/1961 | Zakely | |
| 3,241,211 A | 3/1966 | Racine | |
| 3,424,134 A | 1/1969 | Rosenblum | |
| 3,444,957 A | 5/1969 | Ervin, Jr. | |
| 3,498,408 A | 3/1970 | Foote | |
| 3,717,219 A | 2/1973 | Hoffman | |
| 3,814,210 A | 6/1974 | Hoffman | |
| 3,869,021 A | 3/1975 | Sutherland et al. | |
| 4,347,914 A | 9/1982 | Gary | |
| 4,405,034 A | 9/1983 | Dunne | |
| 4,515,240 A | 5/1985 | Curtis | |
| 4,538,702 A | 9/1985 | Wolner | |
| 4,598,792 A | 7/1986 | Lew et al. | |
| 4,601,161 A | 7/1986 | Drellich | |
| 4,667,772 A | 5/1987 | Kammerer | |
| 4,679,656 A | 7/1987 | Lew et al. | |
| 4,687,074 A | 8/1987 | Green | |
| 4,706,858 A | 11/1987 | Whatley | |
| 4,923,149 A | 5/1990 | Feher | |
| 4,991,689 A | 2/1991 | Cole | |
| 5,029,669 A | 7/1991 | Lew et al. | |
| 5,050,704 A | 9/1991 | Olsson | |
| 5,075,932 A | 12/1991 | Hunt et al. | |
| 5,174,410 A | 12/1992 | Casebolt | |
| 5,178,590 A * | 1/1993 | Stephens | A63B 69/0064 482/43 |
| 5,207,627 A * | 5/1993 | Doran | A61H 1/0218 482/114 |
| 5,256,119 A * | 10/1993 | Tudor | A63B 23/04 128/882 |
| 5,279,386 A | 1/1994 | Cearley | |
| 5,375,279 A * | 12/1994 | Toso | A47C 16/00 602/19 |
| 5,400,869 A | 3/1995 | Rocourt | |
| 5,531,292 A | 7/1996 | Bell | |
| 5,542,433 A | 8/1996 | Saupe | |
| 5,643,184 A * | 7/1997 | Toso | A61F 5/026 450/155 |
| 5,688,011 A | 11/1997 | Gulley | |
| 5,738,046 A | 4/1998 | Williams et al. | |
| 5,802,822 A | 9/1998 | Holzhauser | |
| 5,848,667 A | 12/1998 | Davidson | |
| 5,857,540 A | 1/1999 | Sadeck | |
| 5,878,833 A | 3/1999 | Bell | |
| 6,125,966 A | 10/2000 | Jones | |
| 6,129,691 A | 10/2000 | Ruppert | |
| 6,189,651 B1 | 2/2001 | Sadeck | |
| 6,345,418 B1 | 2/2002 | Bertrand et al. | |
| 6,357,551 B1 | 3/2002 | Bogardus, III | |
| 6,450,131 B1 | 9/2002 | Broman | |
| 6,464,038 B1 | 10/2002 | Park | |
| 6,481,528 B2 | 11/2002 | Antonio | |
| 6,487,725 B1 | 12/2002 | Jordan | |
| 6,520,290 B1 | 2/2003 | Carter | |
| 6,601,890 B1 | 8/2003 | Firth | |
| 6,637,547 B1 | 10/2003 | Wydner | |
| 6,662,372 B2 | 12/2003 | Lewis et al. | |
| 6,732,834 B2 | 5/2004 | Colorado | |
| 6,755,454 B1 | 6/2004 | Cary | |
| 6,792,887 B1 | 9/2004 | Baker | |
| 7,017,527 B2 | 3/2006 | Price | |
| 7,036,628 B2 | 5/2006 | Wilcox et al. | |
| 7,341,025 B1 | 3/2008 | Streeter et al. | |
| 7,386,973 B2 | 6/2008 | Madill, Jr. | |
| 8,061,481 B2 | 11/2011 | Wolner et al. | |
| 8,360,202 B1 | 1/2013 | Woodard | |
| 8,505,683 B1 | 8/2013 | Dirrig | |
| 8,573,359 B2 | 11/2013 | West | |
| 8,651,235 B2 | 2/2014 | Wood | |
| 8,919,496 B2 | 12/2014 | Wolner et al. | |
| 9,089,124 B1 | 7/2015 | Cox et al. | |
| 9,622,566 B1 | 4/2017 | Pinholster, Jr. et al. | |
| 9,763,530 B2 | 9/2017 | Caccavo | |
| 9,937,367 B1 | 4/2018 | Huang et al. | |
| 10,668,309 B2 | 6/2020 | Starholm et al. | |
| 2001/0047904 A1 | 12/2001 | Antonio | |
| 2002/0074185 A1 | 6/2002 | Colorado | |
| 2002/0117353 A1 | 8/2002 | Jones | |
| 2005/0139419 A1 | 6/2005 | Green | |
| 2005/0194211 A1 | 9/2005 | O'Shall et al. | |
| 2005/0230184 A1 | 10/2005 | Ansaldo | |
| 2005/0269475 A1 | 12/2005 | Parker | |
| 2006/0011415 A1 | 1/2006 | Fischer et al. | |
| 2006/0048998 A1 | 3/2006 | Wolner et al. | |
| 2007/0246298 A1 | 10/2007 | Botti | |
| 2007/0272484 A1 | 11/2007 | Helms | |
| 2007/0278036 A1 | 12/2007 | Barta et al. | |
| 2008/0000719 A1 | 1/2008 | Jones | |
| 2008/0060872 A1 | 3/2008 | Wise | |
| 2008/0156583 A1 | 7/2008 | Meeks | |
| 2008/0263755 A1 | 10/2008 | Grilliot et al. | |
| 2009/0038884 A1 | 2/2009 | Helms | |
| 2009/0095232 A1 | 4/2009 | Mckay | |
| 2010/0193288 A1 | 8/2010 | Colorado | |
| 2011/0067953 A1 | 3/2011 | Kopp | |
| 2011/0154797 A1 | 6/2011 | Dahl | |
| 2012/0168472 A1 | 7/2012 | Mathews | |
| 2013/0157821 A1 | 6/2013 | Crowell et al. | |
| 2013/0299277 A1 | 11/2013 | Kyatham et al. | |
| 2015/0060196 A1 | 3/2015 | Wolner et al. | |
| 2017/0165508 A1 | 6/2017 | Wu | |
| 2020/0360739 A1 | 11/2020 | Truesdell | |

FOREIGN PATENT DOCUMENTS

| | | | |
|---|---|---|---|
| GB | 137723 | A | 1/1920 |
| GB | 2225707 | A | 6/1990 |
| SU | 1251933 | A1 | 8/1986 |
| WO | 199110475 | A1 | 7/1991 |
| WO | 199813104 | A1 | 4/1998 |
| WO | 2002062424 | A1 | 8/2002 |
| WO | 2005087321 | A1 | 9/2005 |
| WO | 2014108134 | A1 | 7/2014 |

* cited by examiner

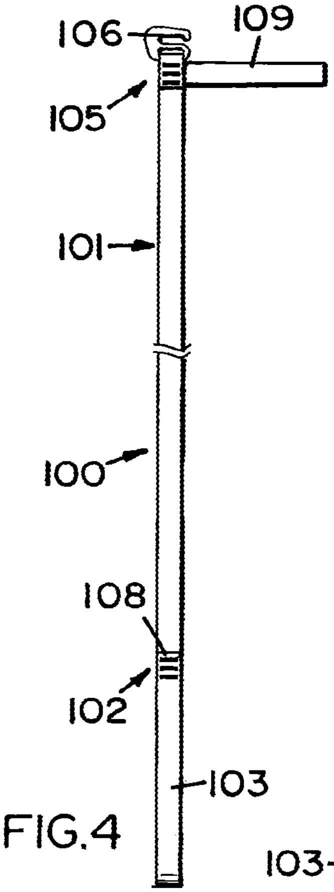
FIG. 4
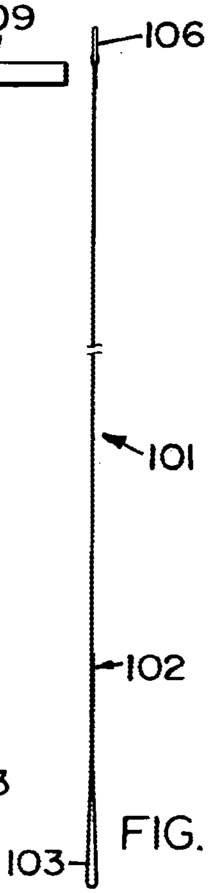
FIG. 5
FIG. 6
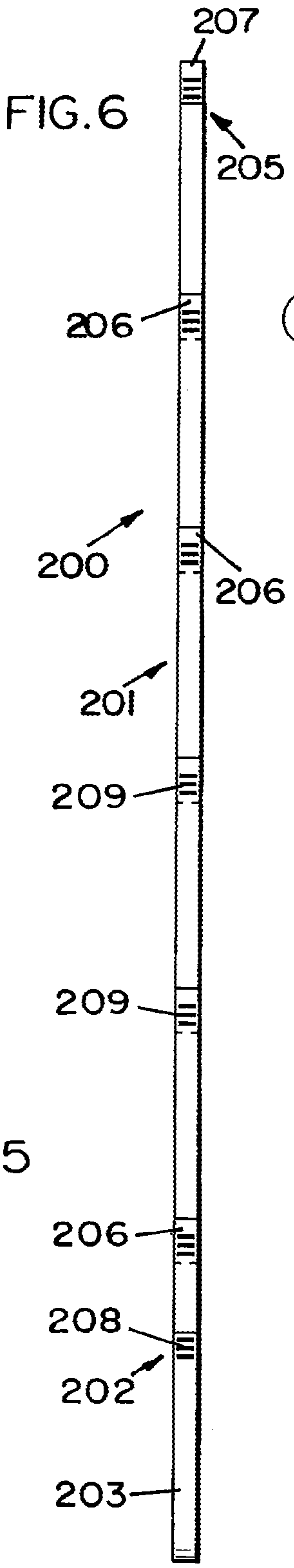
FIG. 7
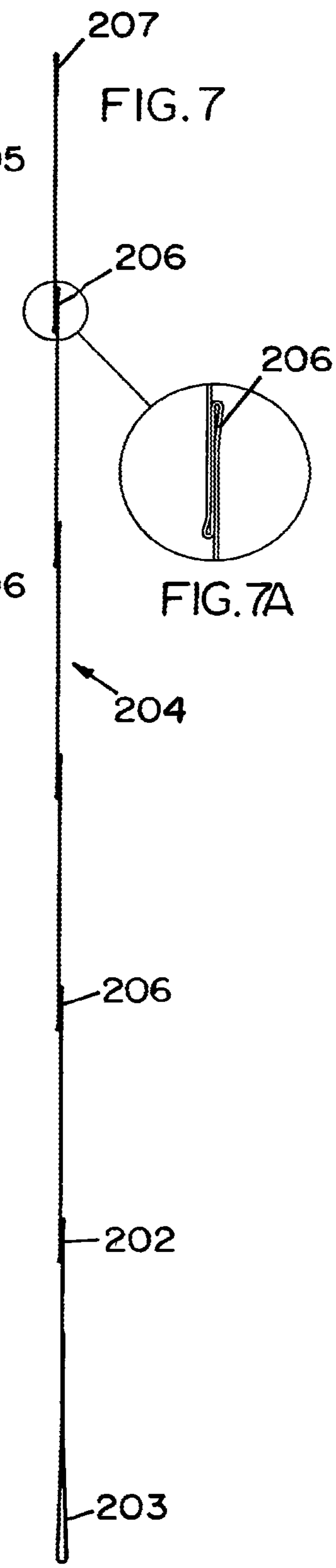
FIG. 7A

FIG.13
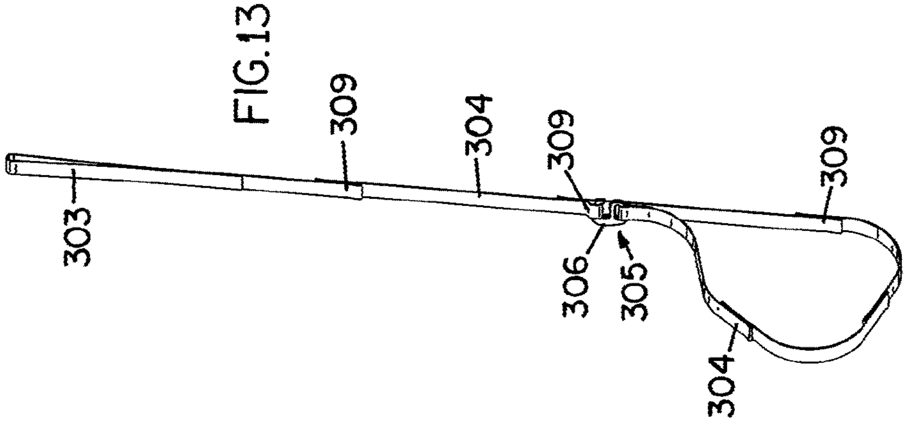
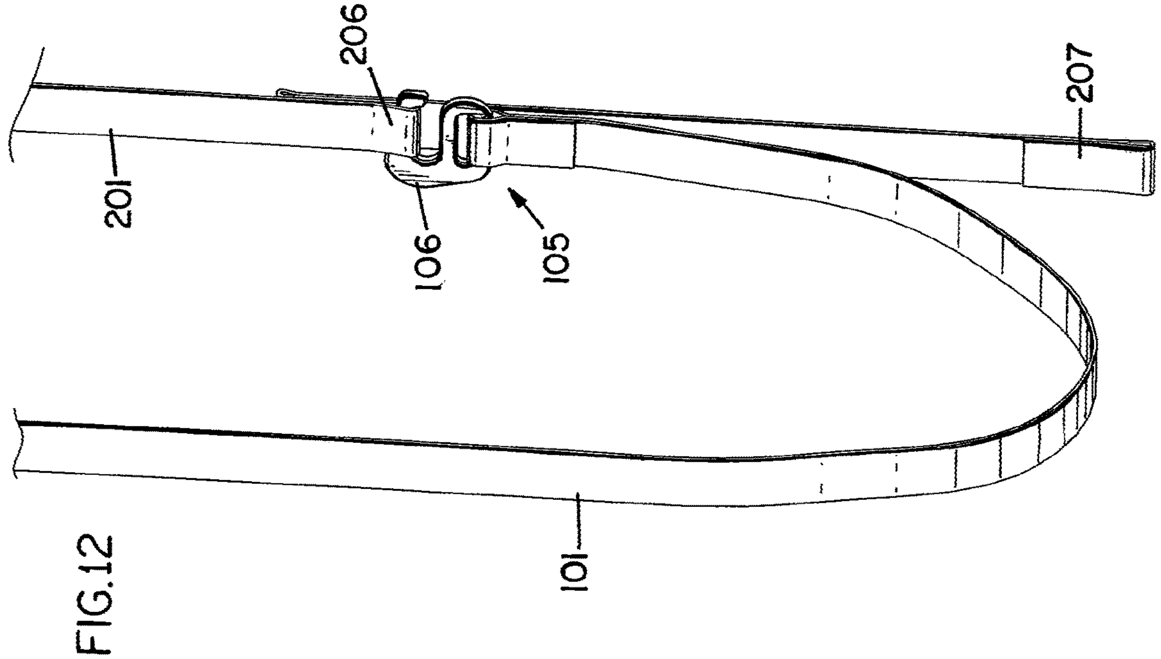
FIG.12

FIG.17
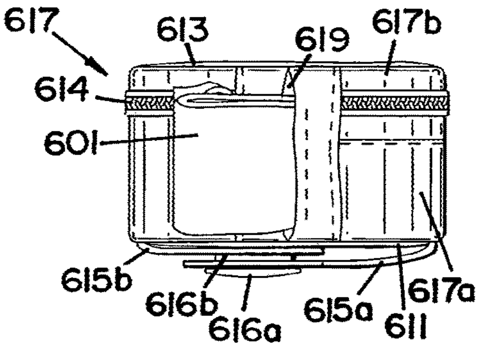
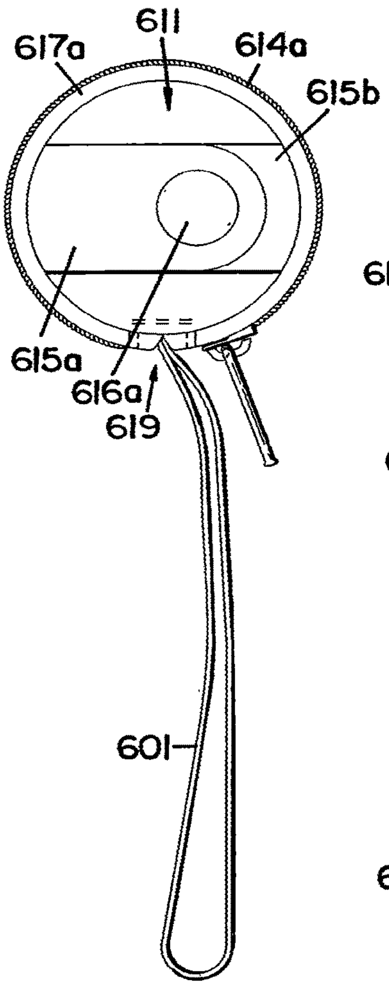
FIG.16
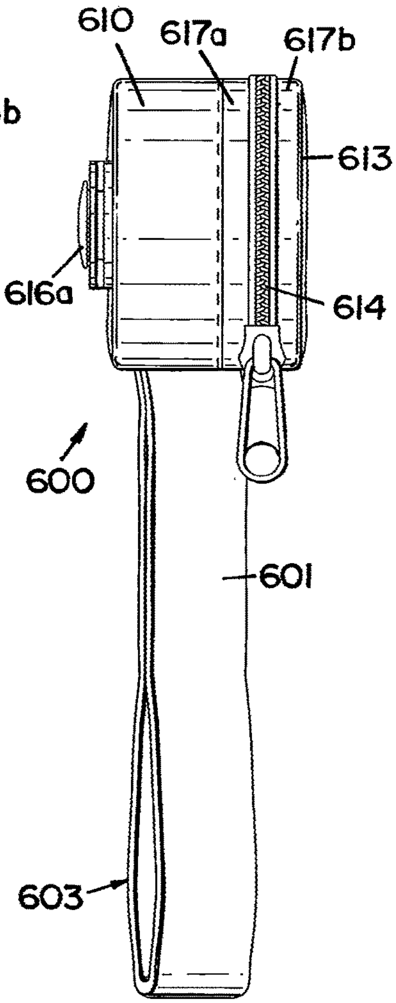
FIG.14
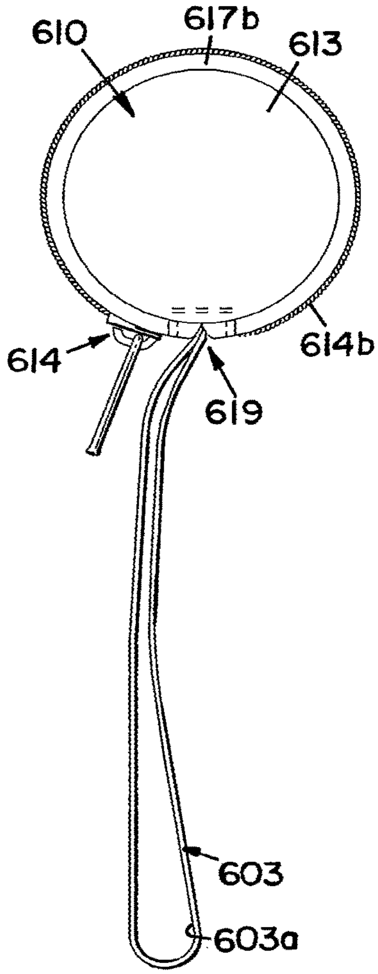
FIG.15

FIG. 19
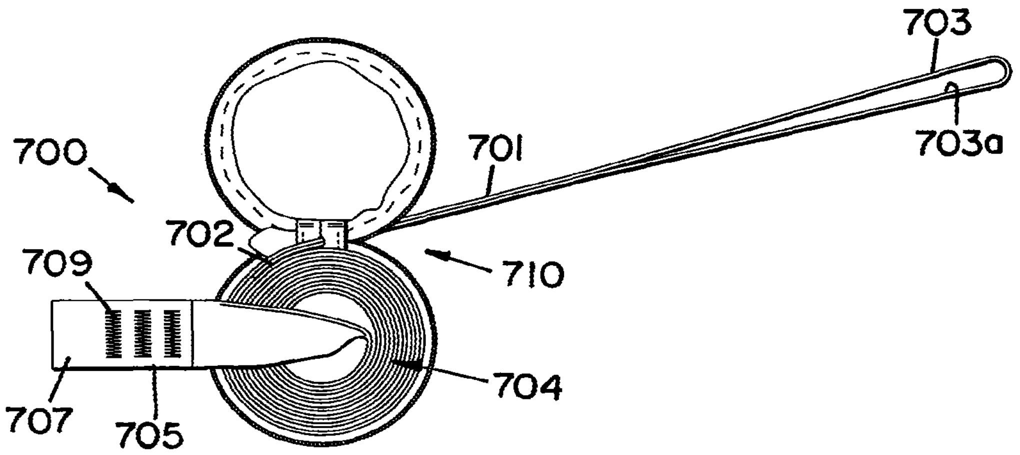
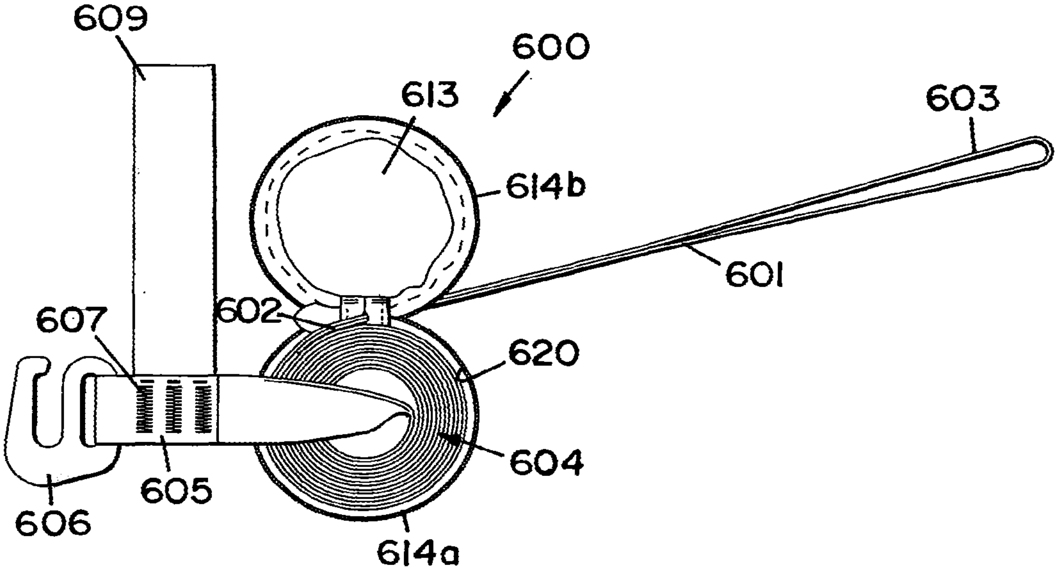
FIG. 18

SUSPENSION TRAUMA RELIEF STRAP ASSEMBLY FOR USE WITH A FULL BODY HARNESS

FIELD OF THE INVENTION

The present invention relates to a suspension trauma relief strap assembly for use with a full body harness.

BACKGROUND OF THE INVENTION

Orthostatic intolerance, also commonly referred to as "suspension trauma", may include symptoms such as lightheadedness, breathlessness, palpitations, tremulousness, poor concentration, fatigue, nausea, dizziness, headache, sweating, paleness, increased or unusually low heart rate, unusually low blood pressure, loss of vision, weakness, and faintness. While in a sedentary position, blood can accumulate in the veins, commonly referred to as "venous pooling," and cause orthostatic intolerance. Venous pooling typically occurs in the legs due to gravity and a lack of movement, and an accumulation of blood in the legs reduces the amount of blood in circulation throughout the rest of the body. The body reacts by speeding up the heart rate in an attempt to maintain sufficient blood flow to the brain. If the blood supply is sufficiently reduced, this reaction will not be effective. The body will abruptly slow the heart rate and the blood pressure will diminish in the arteries. During severe venous pooling, the reduction in quantity and/or quality of oxygen content in the blood flowing to the brain will cause one or more of the above-mentioned symptoms. This reduction of oxygen in the blood can also have an effect on other vital organs such as the kidneys, which may result in renal failure. If these conditions continue, they may be fatal.

Orthostatic intolerance may be experienced by workers using fall protection systems including full body harnesses. After a fall, a worker is suspended by the dorsal D-ring of the full body harness, and the worker is left suspended in a relatively vertical/upright position by the fall protection system until rescued. The worker may remain suspended in the full body harness for a length of time, and the sustained immobility may lead to a state of unconsciousness and/or any of the other above-mentioned symptoms. Depending upon the length of time the suspended worker is unconscious and/or immobile and depending upon the level of venous pooling, the resulting orthostatic intolerance may possibly lead to death. While not common, such fatalities are often referred to as "harness induced pathology".

Unconscious and/or immobile workers suspended in their harnesses will not be able to move their legs and will not fall into a horizontal position as they would if they were standing. While in the relatively vertical/upright position, venous pooling is more likely to occur and cause orthostatic intolerance, especially if the suspended worker is left in such a position for a length of time. If the worker is not rescued timely, in less than 30 minutes, venous pooling and orthostatic intolerance could result in serious injury or even death as the brain, the kidneys, and other organs are deprived of oxygen. Care must be taken during the rescue because moving the worker quickly into a horizontal position could cause cardiac arrest due to the abrupt increase in blood flow to the heart.

OSHA has suggested that footholds may be used to alleviate pressure on the workers' legs and provide support for "muscle pumping" to activate the leg muscles and reduce the risk of venous pooling. Therefore, a full body harness incorporating such a foothold is desired to reduce the risk of suspension trauma.

SUMMARY OF THE INVENTION

A preferred embodiment suspension trauma relief strap assembly for use with a full body harness includes a pair of straps connectable in two configurations. Each strap has a first end, an intermediate portion, and a second end. Each first end includes a connector configured and arranged to engage the full body harness, each intermediate portion includes a plurality of closed loop arrangements, and each second end includes a hook configured and arranged to engage one of the plurality of closed loop arrangements. The first configuration is formed by engaging the hook of one strap with one of the plurality of closed loop arrangements of the other strap, and the pair of straps form a sling upon which a person donning the full body harness may stand. The second configuration is formed by engaging the hook of the one strap with one of the plurality of closed loop arrangements of the one strap and engaging the hook of the other strap with one of the plurality of closed loop arrangements of the other strap, and each strap forms a sling upon which a person donning the full body harness may stand.

A preferred embodiment suspension trauma relief strap assembly for use with a full body harness having a first leg strap and a second leg strap includes a first strap, a hook, a second strap, and a plurality of closed loop arrangements. The first strap has a first end and a second end. The first end includes a first connector configured and arranged to engage the full body harness proximate the first leg strap. The hook is operatively connected to the second end. The second strap has a third end, an intermediate portion, and a fourth end. The third end includes a second connector configured and arranged to engage the full body harness proximate the second leg strap. The plurality of closed loop arrangements is operatively connected to the intermediate portion of the second strap and each is configured and arranged to receive the hook of the first strap. The hook of the first strap engages one of the plurality of closed loop arrangements to connect the first strap and the second strap thereby forming a sling providing a surface upon which a worker may stand to relieve suspension trauma from pressure on the worker's body by the full body harness.

A preferred embodiment suspension trauma relief strap assembly is used with a full body harness having shoulder straps, leg straps, a seat strap, and a dorsal D-ring. The dorsal D-ring is operatively connected to the shoulder straps proximate a rear portion of the full body harness, the seat strap interconnect the shoulder straps, and the leg straps are operatively connected to the seat strap. A worker donning the full body harness is suspended in a relatively upright position by the dorsal D-ring when a fall occurs, the dorsal D-ring pulling the full body harness upward relative to the worker and the full body harness placing pressure on the worker. The suspension trauma relief strap assembly includes a first strap, a second strap, a hook, and a plurality of closed loop arrangements. Each strap has a first end, an intermediate portion, and a second end. The first end of each strap includes a connector configured and arranged to engage one of the shoulder straps of the full body harness proximate the seat strap. The hook is operatively connected to the second end of one of the straps. The plurality of closed loop arrangements is operatively connected to the intermediate portion of another of the straps. The hook of one strap is configured and arranged to engage the plurality of closed loop arrangements of the other strap, and the engaged hook and closed loop arrangement interconnect the first strap and the second strap to form a sling upon which the worker may stand to relieve the pressure of the full body harness on the worker.

A preferred embodiment suspension trauma relief strap assembly for use with a full body harness includes a pair of straps capable of forming a first configuration. Each of the pair of straps has a first end, an intermediate portion, and a second end. Each first end includes a connector configured and arranged to engage the full body harness. The second end of one strap includes a first connecting member, and the intermediate portion of another strap includes a second connecting member. The first connecting member and the second connecting member are configured and arranged to engage one another. A first configuration is formed by engaging the first connecting member of the one strap and the second connecting member of the another strap to form a sling with the pair of straps upon which a person donning the full body harness may stand.

A preferred embodiment suspension trauma relief strap assembly for use with a full body harness includes a strap, a connector, a first connecting member, and a second connecting member. The strap has a first end, a second end, and an intermediate portion. The connector is operatively connected to the first end and is configured and arranged to engage the full body harness. The first connecting member is operatively connected to the second end, and the second connecting member is operatively connected to the intermediate portion. The first connecting member and the second connecting are configured and arranged to engage one another to form a sling upon which a worker donning the full body harness may stand after a fall to relieve suspension trauma.

A preferred embodiment method of forming a sling upon which a worker donning a full body harness may stand after a fall to relieve suspension trauma includes releasing a first strap having a first connecting member, releasing a second strap having a second connecting member, and interconnecting the first strap and the second strap by connecting the first connecting member and the second connecting member thereby forming a sling upon which the worker donning the full body harness may stand.

BRIEF DESCRIPTION OF THE DRAWINGS

FIG. 4 is a front view of a strap of the suspension trauma relief strap assembly shown in FIG. 1;

FIG. 5 is a side view of the strap shown in FIG. 4;

FIG. 6 is a front view of a strap of another suspension trauma relief strap assembly constructed according to the principles of the present invention;

FIG. 7 is a side view of the strap shown in FIG. 6;

FIG. 7A is a magnified view of a portion of the strap shown in FIG. 7;

FIG. 12 is a perspective view of a portion of the suspension trauma relief strap assembly shown in FIG. 4 connected to the suspension trauma relief strap assembly shown in FIG. 6;

FIG. 13 is a perspective view of a portion of the suspension trauma relief strap assembly shown in FIG. 8;

FIG. 14 is a side view of another embodiment suspension trauma relief strap assembly constructed according to the principles of the present invention;

FIG. 15 is a front view of the suspension trauma relief strap assembly shown in FIG. 14;

FIG. 16 is a rear view of the suspension trauma relief strap assembly shown in FIG. 14;

FIG. 17 is a top view of the suspension trauma relief strap assembly shown in FIG. 14;

FIG. 18 is a front view of the suspension trauma relief strap assembly shown in FIG. 14 with the cover opened; and FIG. 19 is a front view of another suspension trauma relief strap assembly for use with the suspension trauma relief strap assembly shown in FIG. 18.

DETAILED DESCRIPTION OF A PREFERRED EMBODIMENT

Figure 1:
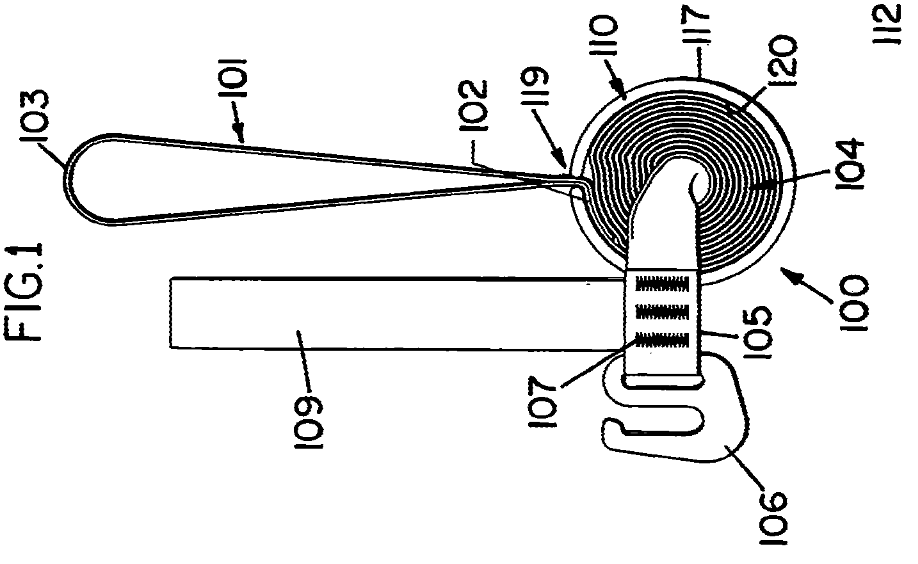
FIG. 1 is a front view of a suspension trauma relief strap assembly constructed according to the principles of the present invention.

Preferred embodiment suspension trauma relief strap assemblies constructed according to the principles of the present invention are designated by the numerals 100, 200, 300, 600, and 700 in the drawings.

Figure 2:
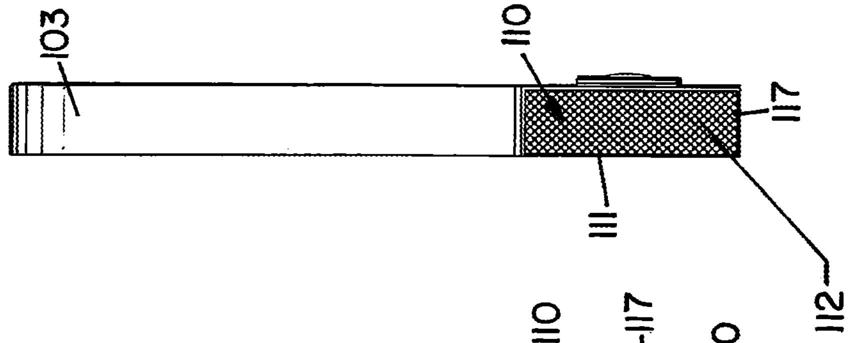
FIG. 2 is a side view of the suspension trauma relief strap assembly shown in FIG. 1.
Figure 3:
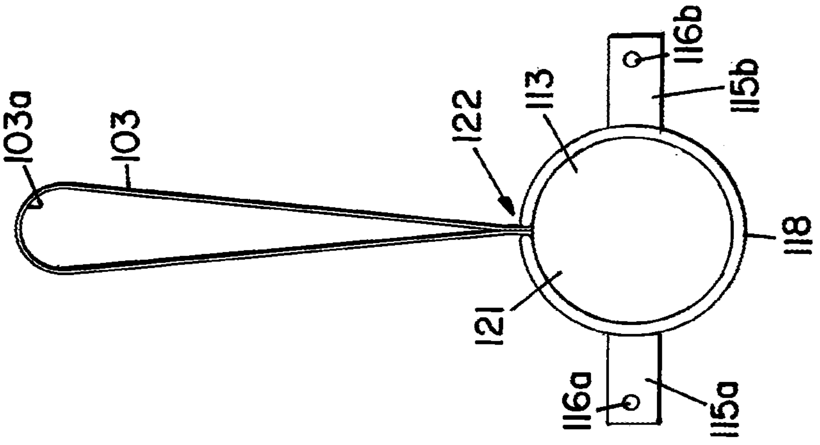
FIG. 3 is a front view of the suspension trauma relief strap assembly shown in FIG. 1 including a cover and a securing member.
Figure 8:
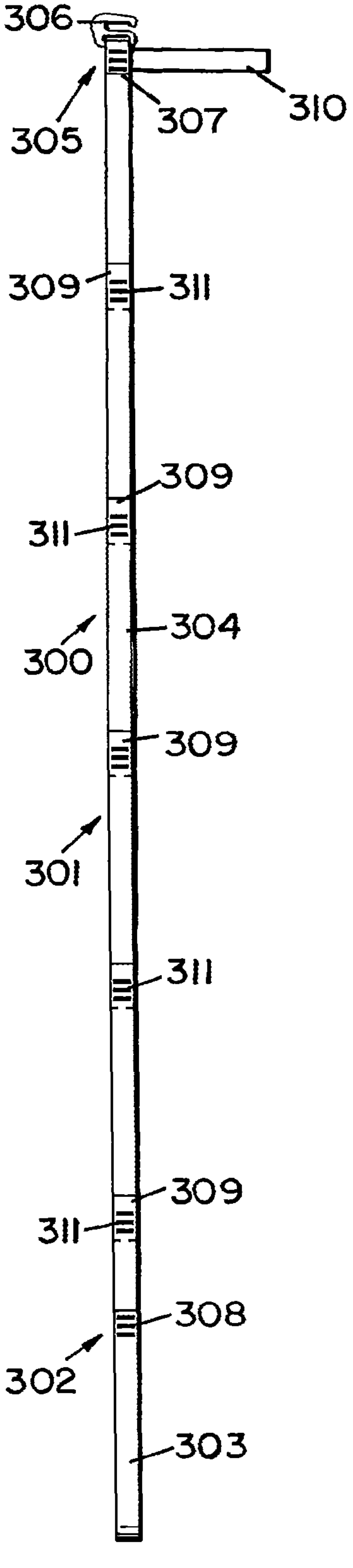
FIG. 8 is a front view of a strap of another suspension trauma relief strap assembly constructed according to the principles of the present invention.

As shown in FIGS. 1-3, the suspension trauma relief strap assembly 100 includes a strap 101 and a housing 110. The strap 101, as shown in FIGS. 4 and 5, includes a first end 102, an intermediate portion 104, and a second end 105. The first end 102 includes a connector 103, which is preferably a loop formed in the strap 101 by folding over the end of the first end 102 and securing the end to another portion of the first end 102 by stitching 108. The connector 103 includes an opening 103*a* between the portions of the strap 101. Although a loop formed in the strap 101 is the preferred type of connector 103, other suitable types of connectors known in the art such as but not limited to a hook or a buckle could be used.

A hook 106 is operatively connected to the second end 105. The hook 106 includes a slot through which the end of the second end 105 is inserted, folded over, and secured to another portion of the second end 105 by stitching 107. An optional pull tab 109 may be inserted between the end and the other portion of the second end 105 and secured therebetween by the stitching 107. The pull tab 109 extends outward from the strap 101 to provide convenient access to the strap 101. The pull tab 109 may have “pull to deploy” marked on it.

Figure 11:
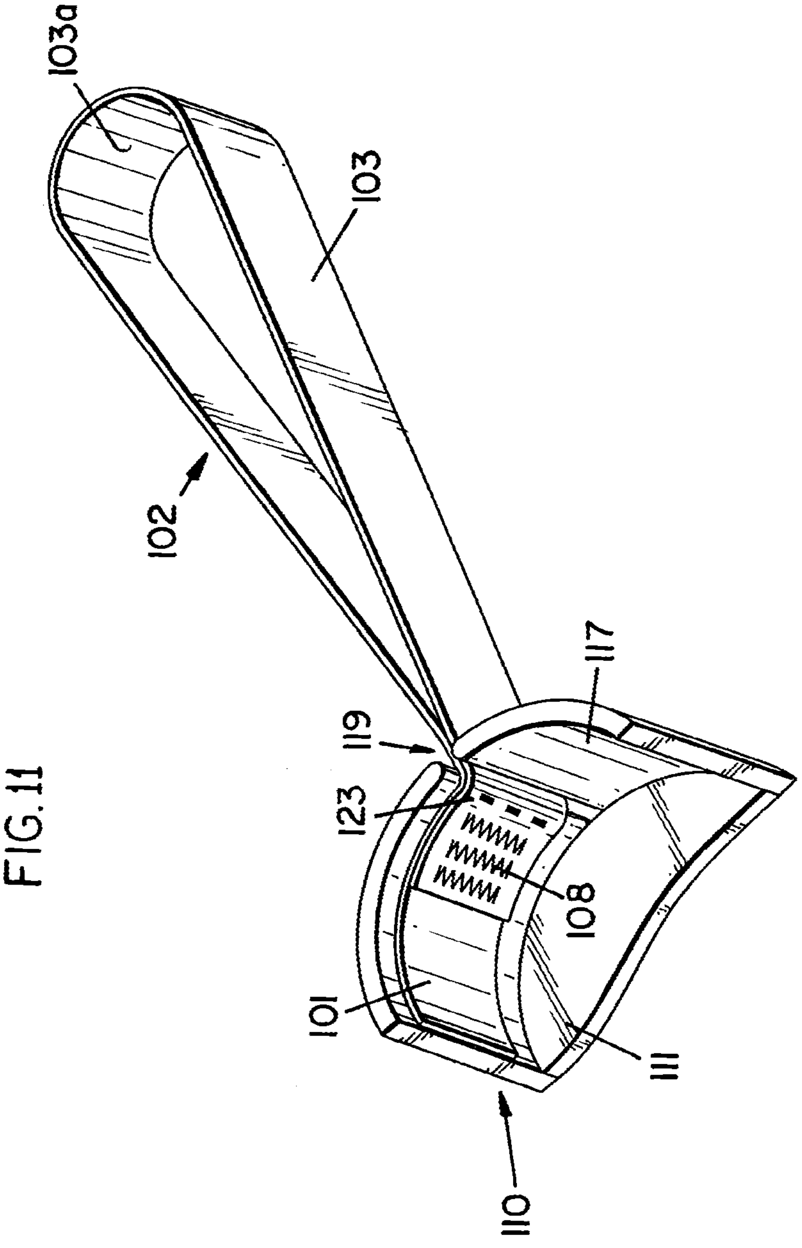
FIG. 11 is a perspective view of a portion of the suspension trauma relief strap assembly shown in FIG. 1.

The housing 110 includes a back 111 and a side 117 preferably made of a light weight material such as but not limited to nylon. The back 111 is preferably a circular disk member, and the side 117 is operatively connected to the back 111 and includes a slot 119. The side 117 does not completely border the circumference of the back 111 to form the slot 119 between the ends of the side 117. The strap 101 is preferably secured to the inside surface of the side 117 of the housing 110 by stitching 123 proximate the slot 119, and the connector 103 extends through the slot 119 and out of the housing 110 as shown in FIG. 11. The back 111 and the side 117 form a cavity 120 in which the strap 101 is placed and stored. The cavity 120 is sized to correspond with the size of the strap 101 when folded or wound into a compact configuration. The depth of the cavity 120 and the width of the slot 119 are preferably configured and arranged to accommodate the width of the strap 101. The outside surface of the side 117 preferably includes a fastener 112 such as hook or loop. It is recognized that other fasteners such as but not limited to zippers, snaps, or other suitable fasteners well known in the art could also be used.

A cover 113 includes a front 121 and a side 118 preferably made of a light weight material such as but not limited to nylon. The front 121 is preferably a circular disk member, and the side 118 is operatively connected to the front 121 and includes a slot 122. Like the side 117, the side 118 does not completely border the circumference of the front 121 to form the slot 122 between the ends of the side 118. The front 121 is configured and arranged to cover the cavity 120 and the side 118 is configured and arranged to overlap the side 117 with the slots 119 and 122 aligning to allow the connector 103 to extend therethrough. The inside surface of the side 118 preferably includes a fastener 114 such as hook or loop to mate with the fastener 112 of the housing 110. Again, it is recognized that other fasteners such as but not limited to zippers, snaps, or other suitable fasteners well known in the art could also be used to mate with the fastener 112 of the side 117.

The strap 101 is preferably wound into a spiral configuration, such as that shown in FIG. 1 with the second end 105 proximate the center of the spiral configuration, and packed into the cavity 120 of the housing 110. Preferably, the hook 106 should be taken from the center of the spiral configuration and placed proximate the opening into the cavity 120 opposite the back 111 so that it is readily accessible. If a pull tab 109 is used, the pull tab 109 should also be readily accessible within the cavity 120. Once arranged in a compact configuration and placed in the cavity 120, the cover 113 is placed on the housing 110.

The connector 103 is preferably large enough to wrap around a strap of a full body harness and insert the housing 110 and the cover 113 containing the strap 101 through the opening 103*a* between the portions of the strap 101 to secure the suspension trauma relief strap assembly 100 to the full body harness. Optional securing members 115*a* and 115*b*, which are preferably tabs extending outward from the housing 110, may be operatively connected between the back 111 and the side 117 and include a first snap portion 116*a* and second snap portion 116*b*, respectively. The securing members 115*a* and 115*b* may be wrapped around the strap of the full body harness and the snap portions 116*a* and 116*b* connected to one another to further secure the suspension trauma relief strap assembly 100 to the full body harness.

The suspension trauma relief strap assembly 200 includes a strap 201 and a housing 210. The strap 201, shown in FIGS. 6, 7, and 7A, includes a first end 202, an intermediate portion 204, and a second end 205. The first end 202 includes a connector 203, which is preferably a loop formed in the strap 201 by folding over the end of the first end 202 and securing the end to another portion of the first end 202 by stitching 208. The connector 203 includes an opening 203*a* between the portions of the strap 201. The intermediate portion 204 includes a plurality of closed loop arrangements 206, which are preferably formed in the strap 201 by overlapping portions of the strap 201 into an "S" configuration and securing the overlapping portions with stitching 209. One end of the "S" configuration forms an opening through which the prong of the hook 106 may be inserted. It is recognized that the plurality of closed loop arrangements 206 may also be separate members operatively connected to the strap 201. The second end 205 includes a loop 207, which is preferably formed in the strap 201 by folding over the end of the second end 205 and securing the end to another portion of the second end 205 by stitching 209. The plurality of loops 206 and the loop 207 are configured and arranged to receive the prong of the hook 106 of the strap 101. The prong of the hook 106 engages one of the loops 206 or 207 to connect the straps 101 and 201 to form a sling, which provides a surface upon which a worker donning a full body harness may stand to relieve suspension trauma from pressure on the worker's body by the full body harness. This is shown in FIG. 12. Because the hook 106 may engage any one of the plurality of loops 206 and the loop 207, the device is adjustable to accommodate varying heights of workers. The housing 210 is preferably similarly constructed as described with regard to housing 110.

The suspension trauma relief strap assembly 300 includes a strap 301 and a housing (not shown). The strap 301 includes a first end 302, an intermediate portion 304, and a second end 305. The first end 302 includes a connector 303, which is preferably a loop formed in the strap 301 by folding over the end of the first end 302 and securing the end to another portion of the first end 302 by stitching 308. The connector 303 includes an opening between the portions of the strap 301. The intermediate portion 304 includes a plurality of closed loop arrangements 309, which are preferably formed in the strap 301 by overlapping portions of the strap 301 into an "S" configuration and securing the overlapping portions with stitching 311. One end of the "S" forms an opening through which the prong of the hook 306 may be inserted. It is recognized that the plurality of closed loop arrangements 309 may also be separate members operatively connected to the strap 301. The plurality of closed loop arrangements 309 are configured and arranged to receive the hook 306 of the strap 301. A hook 306 is operatively connected to the second end 305. The hook 306 includes a slot through which the end of the second end 305 is inserted, folded over, and secured to another portion of the second end 305 by stitching 307. The prong of the hook 306 engages one of the loops 309 to form a sling, which provides a surface upon which a worker donning a full body harness may stand to relieve suspension trauma from pressure on the worker's body by the full body harness.

Figure 10:
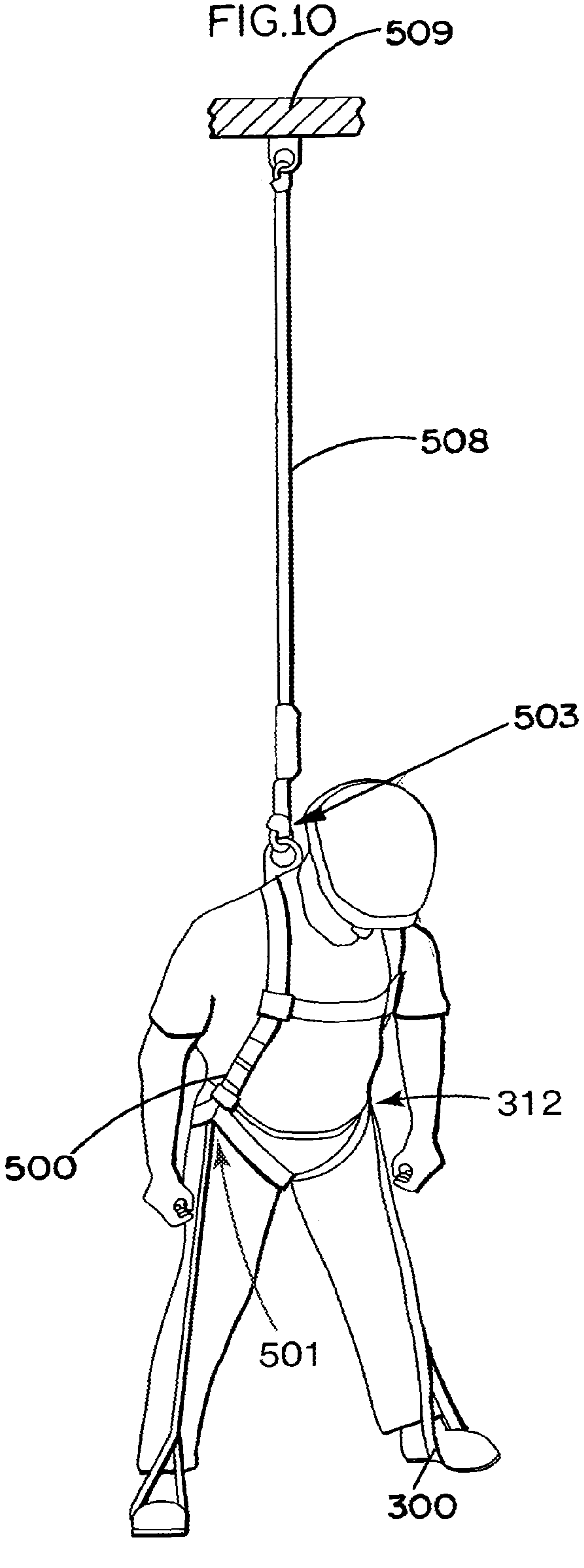
FIG. 10 is a perspective view of a worker donning a full body harness and utilizing a suspension trauma relief strap assembly suspended from a support structure.

Preferably, two straps 301 are used and they are connectable in two configurations. In the first configuration, each strap 301 may form separate slings, a sling for supporting each foot separately. More specifically, the prong of the hook 306 engages one of the loops 309 on the same strap 301 so that there is a sling at the bottom of each strap 301 in which each foot is placed so that each foot has a separate sling and is supported separately. Alternatively, one strap 301 may be used in this first configuration for supporting one foot or both feet. This first configuration is shown in FIGS. 10 and 13. In the second configuration, the straps 301 may engage one another to form one sling for supporting both feet together. More specifically, the hook 306 of one strap 301 engages one of the loops 309 on the other strap 301 so that there is one sling in which both feet are placed so that both feet are supported together by one sling. This second configuration is similar to that shown in FIG. 12. Because the hooks 306 may engage any one of the loops 309, the device in either of the configurations is adjustable to accommodate varying heights of workers. An optional pull tab 310 may be inserted between the end and the other portion of the second end 305 and secured thereto by the stitching 307.

As shown in FIGS. 14-18, the suspension trauma relief strap assembly 600 includes a strap 601 and a housing 610. The strap 601, as shown in FIG. 18, includes a first end 602, an intermediate portion 604, and a second end 605. The first end 602 includes a connector 603, which is preferably a loop formed in the strap 601 by folding over the end of the first end 602 and securing the end to another portion of the first end 602 by stitching (not shown). The connector 603 includes an opening 603*a* between the portions of the strap 601. Although a loop formed in the strap 601 is the preferred type of connector 603, other suitable types of connectors known in the art such as but not limited to a hook or a buckle could be used.

A hook 606 is operatively connected to the second end 605. The hook 606 includes a slot through which the end of the second end 605 is inserted, folded over, and secured to another portion of the second end 605 by stitching 607. An optional pull tab 609 may be inserted between the end and the other portion of the second end 605 and secured therebetween by the stitching 607. The pull tab 609 extends outward from the strap 601 to provide convenient access to the strap 601. The pull tab 609 may have "pull to deploy" marked on it.

The housing 610 includes a back 611, a cover 613, and a side 617 preferably made of a light weight material such as but not limited to nylon. The back 611 and the cover 613 are preferably circular disk members, and the side 617 interconnects the back 611 and the cover 613. The side 617 preferably includes a first portion 617*a* and a second portion 617*b* and includes a slot 619. The first portion 617*a* is operatively connected to the back 611 and the second portion 617*b* is operatively connected to the cover 613, preferably by stitching. The side 617 does not completely border the circumferences of the back 611 and the cover 613 to form the slot 619 between the two ends of the side 617. The strap 601 is preferably secured to the inside surface of the first portion 617*a* of the side 617 of the housing 610 by stitching (not shown) proximate the slot 619, and the connector 603 extends through the slot 619 and out of the housing 610 as shown in FIG. 18.

The back 611 and first portion 617*a* of the side 617 form a cavity 620 in which the strap 601 is placed and stored. The cavity 620 is sized to correspond with the size of the strap 601 when folded or wound into a compact configuration. The depth of the cavity 620 and the width of the slot 619 are preferably configured and arranged to accommodate the width of the strap 601. The two portions 617*a* and 617*b* of the side 617 preferably include mating portions 614*a* and 614*b* of a fastener 614 such as a zipper. It is recognized that other fasteners such as but not limited to hook and loop, snaps, or other suitable fasteners well known in the art could also be used. The fastener 614 releasably interconnects the back 611 and the cover 613 so that the cover 613 may be opened thereby allowing access to the cavity 620. Preferably, a majority of the back 611 and the cover 613 are interconnected by the fastener 614 so that the housing 610 resembles a clam shell with a minority of the back 611 and the cover 613 remaining interconnected when the fastener 614 is opened.

The strap 601 is preferably wound into a spiral configuration, such as that shown in FIG. 18, with the second end 605 proximate the center of the spiral configuration, and packed into the cavity 620 of the housing 610. Preferably, the hook 606 should be taken from the center of the spiral configuration and placed proximate the opening into the cavity 620 opposite the back 611 so that it is readily accessible. If a pull tab 609 is used, the pull tab 609 should also be readily accessible within the cavity 620 proximate the cover 613. Once arranged in a compact configuration and placed in the cavity 620, the cover 613 is placed on the back 611 and the fastener 614 is secured.

The connector 603 is preferably large enough to wrap around a strap of a full body harness and insert the housing 610 containing the strap 601 through the opening 603*a* between the portions of the strap 601 to secure the suspension trauma relief strap assembly 600 to the full body harness. Optional securing members 615*a* and 615*b*, which are preferably tabs operatively connected to opposing sides of the housing 610, may be operatively connected between the back 611 and the side 617 and include a first snap portion 616*a* and second snap portion 616*b*, respectively. The securing members 615*a* and 615*b* may be wrapped around the strap of the full body harness and the snap portions 616*a* and 616*b* connected to one another to further secure the suspension trauma relief strap assembly 600 to the full body harness.

The suspension trauma relief strap assembly 700, shown in FIG. 19, includes a strap 701 and a housing 710. The strap 701 includes a first end 702, an intermediate portion 704, and a second end 705. The first end 702 includes a connector 703, which is preferably a loop formed in the strap 701 by folding over the end of the first end 702 and securing the end to another portion of the first end 702 by stitching (not shown). The connector 703 includes an opening 703*a* between the portions of the strap 701. The intermediate portion 704 includes a plurality of closed loop arrangements (not shown), which are preferably formed in the strap 701 by overlapping portions of the strap 701 into an "S" configuration and securing the overlapping portions with stitching. One end of the "S" configuration forms an opening through which the prong of the hook 606 of the strap 601 may be inserted. It is recognized that the plurality of closed loop arrangements may also be separate members operatively connected to the strap 701. The second end 705 includes a loop 707, which is preferably formed in the strap 701 by folding over the end of the second end 705 and securing the end to another portion of the second end 705 by stitching 709.

The plurality of loops and the loop 707 are configured and arranged to receive the prong of the hook 606 of the strap 601. The prong of the hook 606 engages one of the loops 706 or 707 to connect the straps 601 and 701 to form a sling, which provides a surface upon which a worker donning a full body harness may stand to relieve suspension trauma from pressure on the worker's body by the full body harness. Because the hook 606 may engage any one of the plurality of loops and the loop 707, the device is adjustable to accommodate varying heights of workers. The housing 710 is preferably similarly constructed as described with regard to housing 610.

Figure 9:
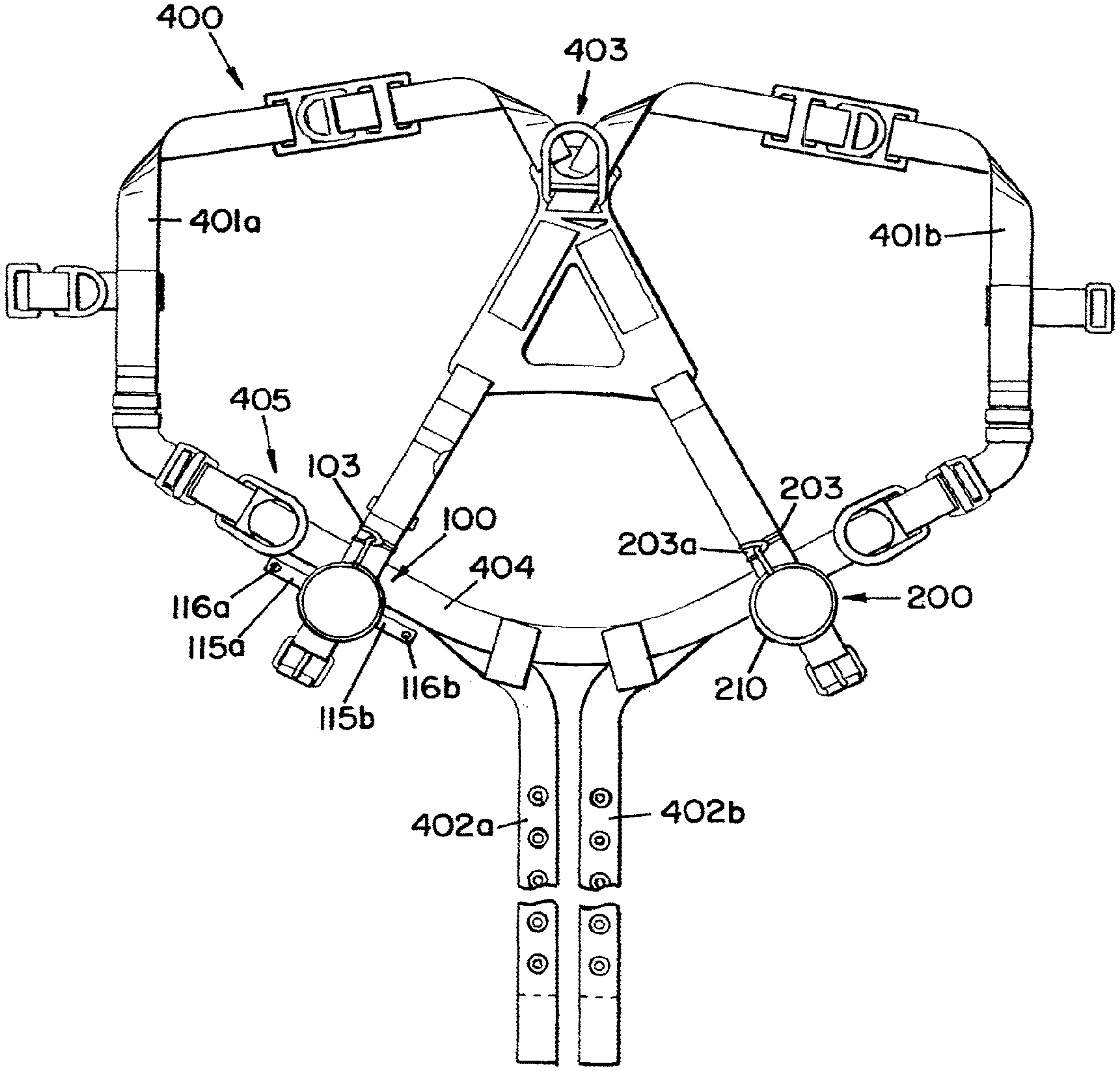
FIG. 9 is a rear view of a full body harness including the suspension trauma relief strap assembly shown in FIG. 1 and the suspension trauma relief strap assembly shown in FIG. 6.

Full body harnesses are well known in the art, and it is recognized that the present invention may be used with many different styles of full body harnesses. A full body harness 400 that may be used with the present invention is shown in FIG. 9 and includes shoulder straps 401*a* and 401*b*, leg straps 402*a* and 402*b*, a dorsal D-ring 403, and a seat strap 404. The shoulder straps 401*a* and 401*b* criss-cross in divergent fashion at a juncture proximate the rear portion of the harness 400, and the dorsal D-ring 403 is operatively connected to the shoulder straps 401*a* and 401*b* proximate the juncture. The seat strap 404 interconnects the shoulder straps 401*a* and 401*b*, and the leg straps 402*a* and 402*b* are operatively connected to the seat strap 404. Side D-rings 405 may also be operatively connected to the seat strap 404.

For illustrative purposes, suspension trauma relief strap assemblies 100 and 200 are shown operatively connected to the full body harness 400, and it is recognized that the other embodiments may be similarly operatively connected to full body harnesses. The connector 103 is wrapped about the shoulder strap 401*b* above the seat strap 404 and then the housing 110 and the cover 113 containing the strap 101 are inserted through the opening 103*a* between the portions of the strap 101 of the connector 103. The strap 101 is then secured to the full body harness 400, and the housing 110 and the cover 113 are preferably positioned proximate the seat strap 404. The securing members 115*a* and 115*b* are then wrapped about the shoulder strap 401*b* below the seat strap 404 and the snaps 116*a* and 116*b* are fastened together to further secure the housing 110 to the full body harness 400. The suspension trauma relief strap assembly 200 is similarly secured to the shoulder strap 401*a* of the full body harness 400. Any suitable connector may be used to secure the assemblies 100 and 200 to the full body harness 400. There are many different types of full body harnesses that may be used, and it is recognized that the connector of the suspension trauma relief strap assembly may also be connected to the seat strap, the side D-rings, or any other suitable location on the full body harness that alleviates pressure on the worker's body so as to not constrict the worker's body when suspended.

The suspension trauma relief strap assembly 100 and the suspension trauma relief strap assembly 200 are preferably used together with a full body harness, one or two of the suspension trauma relief strap assemblies 300 are preferably used with a full body harness, and the suspension trauma relief strap assembly 600 and the suspension trauma relief strap assembly 700 are preferably used together with a full body harness. As discussed above, the suspension trauma relief strap assembly 100 is operatively connected to one side of the full body harness and the suspension trauma relief strap assembly 200 is operatively connected to the other side of the full body harness such as shown in FIG. 9. Similarly, the suspension trauma relief strap assembly 300 is operatively connected to one or each side of the full body harness such as shown in FIG. 10. Similarly, the suspension trauma relief strap assembly 600 is operatively connected to one side of the full body harness and the suspension trauma relief strap assembly 700 is operatively connected to the other side of the full body harness. However, it is recognized that various combinations of the features of these devices is possible and may be used interchangeably.

When a fall has occurred, as shown in FIG. 10, the worker donning the full body harness 500 is suspended in a relatively upright position from a support structure 509 by a lanyard 508 operatively connected to the dorsal D-ring 503 of the full body harness 500. The dorsal D-ring 503 tends to pull the shoulder straps of the full body harness 500 upward relative to the worker, which places pressure on the worker's body. Pressure will likely be placed on the inner thighs of the worker by the leg straps of the full body harness 500. When suspended by the dorsal D-ring 503, and if rescue is not imminent, the worker (if conscious) may choose to utilize the device of the present invention to reduce the risk of suspension trauma.

In operation, the cover is detached from the housing to expose the strap within the cavity. If a pull tab is present, the pull tab is pulled to release the strap from the housing and from the compact configuration. If a pull tab is not present, the hook or the end of the strap is pulled to release the strap from the housing and from the compact configuration. This is performed for each device. Then, the hook is inserted through one of the loops to form a sling, which is a foothold or a support upon which the worker may "stand". As discussed above, either one or two slings may be formed. Due to the fall, the worker is suspended by the dorsal D-ring, which pulls the shoulder straps upward and/or taut proximate the back of the worker. The sling is operatively connected to the portions of the shoulder strap being pulled by the dorsal D-ring (proximate the ends of the rear portions of the shoulder straps above the junctures with the seat strap), and when the worker "stands" on the sling, the pressure extends from the dorsal D-ring to the sling rather than to the worker. This allows for the load or the pressure to be taken off the worker's body and the other straps of the full body harness because the load is applied from the dorsal D-ring to the sling instead. As a result, the other straps of the full body harness loosen so as to not constrict the worker's body when suspended. By using the suspension relief strap assembly, the worker is able to "stand" on the provided sling to relieve the pressure from the full body harness and reduce the risk of suspension trauma.

The straps of the suspension trauma relief strap assemblies are preferably made of ¾ inch nylon webbing having a minimum tensile strength of 900 pounds. The hooks are preferably made of steel and the prongs of the hooks are configured and arranged to engage all of the loops, which are preferably 14 mm loops. The stitching is preferably capable of maintaining a load of 500 pounds.

In addition, it is recognized that rather than interconnecting the two straps of the suspension trauma relief strap assemblies with a hook engaging one of a plurality of closed loop arrangements, buckles, snaps, or other suitable connecting members could be used to interconnect the two straps. Similarly, buckles, snaps, or other suitable connecting members could be used to form a sling at the bottom of each strap individually.

The device of the present invention may be retrofittable to accommodate most styles of full body harnesses and is reusable on another full body harness should a fall occur and the full body harness must be discarded. The device may also be sewn directly onto the full body harness rather than used as a retrofit, reusable accessory. With reference to FIG. 10, this may be done e.g. at a location of contact 501 between an upper end of the (unnumbered) first strap assembly and a strap of the full body harness; similarly, this may be done at a location of contact 312 between an upper end of the second strap assembly 300 and a strap of the full body harness.

The above specification, examples and data provide a complete description of the manufacture and use of the composition of the invention. Since many embodiments of the invention can be made without departing from the spirit and scope of the invention, the invention resides in the claims hereinafter appended. This application is a continuation of U.S. application Ser. No. 16/191,633 (issued as U.S. patent Ser. No. 11/577,104), which was a continuation of U.S. application Ser. No. 14/535,102 (issued as U.S. Pat. No. 11,058,905), which was a continuation of U.S. application Ser. No. 12/250,216 (issued as U.S. Pat. No. 8,919,496, which was a continuation of U.S. application Ser. No. 11/184,549 (issued as U.S. Pat. No. 8,061,481), which claimed priority to U.S. Provisional Application No. 60/590,248, the disclosures of all of which are incorporated by reference in their entirety herein.

We claim:

1. A full body harness comprising:

(a) a dorsal D-ring operatively connected to the harness; and (b) a suspension trauma relief strap assembly comprising:

(i) a first strap assembly component operatively connected to one side of the harness; and (ii) a second strap assembly component operatively connected to the other side of the harness, wherein the suspension trauma relief strap assembly is configured to be in a stored position in which the first and second strap assembly components are stored in respective first and second housings, and is further configured to be deployable from the stored position into a deployed position in which the first and second strap assembly components connect to provide a single foot-supporting sling, the single foot-supporting sling being configured to support both feet of a worker to transfer weight to the D-ring.

2. The full body harness of claim 1 wherein the first strap assembly component comprises a first connector that connects the first strap assembly component to the harness and wherein the second strap assembly component comprises a second connector that connects the second strap assembly component to the harness.

3. The full body harness of claim 2 wherein the first connector of the first strap assembly component comprises a first loop provided at a first end of a first strap of the first strap assembly component.

4. The full body harness of claim 3 wherein the first connector of the first strap assembly component is connected to a first shoulder strap of the full body harness by wrapping the first loop of the first end of the first strap around the first shoulder strap and inserting the first strap through the first loop of the first strap.

5. The full body harness of claim 3 wherein the first loop is provided at the first end of the first strap of the first strap assembly component by folding over an end portion of the first end of the first strap and securing the end portion of the first end of the first strap to another portion of the first end of the first strap by stitching.

6. The full body harness of claim 1 wherein the first and second strap assembly components are connected to the full body harness by sewing.

7. The full body harness of claim 3 wherein the first connector of the first strap assembly component comprises a hook or buckle.

8. The full body harness of claim 2 wherein the first strap assembly component resides in the first housing when the first strap assembly component is in the stored position, with the first connector of the first strap assembly component extending from the first housing to connect the first strap assembly component to the full body harness; and, wherein the second strap assembly component resides in the second housing when the second strap assembly component is in a stored position, with the second connector of the second strap assembly component extending from the second housing to connect the second strap assembly component to the full body harness.

9. The full body harness of claim 8 wherein the first housing comprises at least one first slot through which the first connector of the first strap assembly component extends out of the first housing.

10. The full body harness of claim 9 wherein the at least one first slot is located in a sidewall of the first housing.

11. The full body harness of claim 8 wherein a first strap of the first strap assembly component is secured to an inside surface of the first housing by stitching.

12. The full body harness of claim 1 wherein a first strap of the first strap assembly component is wound into a spiral configuration in a first cavity of the first housing.

13. The full body harness of claim 1 wherein a first strap of the first strap assembly component is folded into a compact configuration in a first cavity of the first housing.

14. The full body harness of claim 1 wherein the first housing comprises a first cover that is openable to remove the first strap assembly component from the first housing to deploy the first strap assembly component into the deployed position.

15. The full body harness of claim 14 wherein the first housing comprises at least one first slot through which a first connector of the first strap assembly component extends out of the first housing to connect the first strap assembly component to the harness, with the at least one first slot and the first cover being located in different portions of the first housing.

16. The full body harness of claim 1 wherein the suspension trauma relief strap assembly is adjustable to accommodate varying heights of workers.

17. The full body harness of claim 1 wherein the first strap assembly component is operatively connected to a first lateral side of the harness and the second strap assembly component is operatively connected to a second, opposing lateral side of the harness.

18. The full body harness of claim 17 wherein the first strap assembly component is operatively connected to a first shoulder strap on the first lateral side of the harness and the second strap assembly component is operatively connected to a second shoulder strap on the second, opposing lateral side of the harness.

19. The full body harness of claim 18 wherein the first strap assembly component is operatively connected to the first shoulder strap proximate an end of a rear portion of the first shoulder strap, above a juncture of the rear portion of the first shoulder strap with a seat strap of the full body harness, and wherein the second strap assembly component is operatively connected to the second shoulder strap proximate an end of a rear portion of the second shoulder strap, above a juncture of the rear portion of the second shoulder strap with a seat strap of the full body harness.

20. The full body harness of claim 1 wherein the first strap assembly component comprises a first strap comprising one or more first connecting members and wherein the second strap assembly component comprises a second strap comprising one or more second connecting members, the one or more first connecting members and the one or more second connecting members being configured so that the one or more first connecting members are connectable to the one or more second connecting members to connect the first and second strap assembly components to form the single foot-supporting sling configured to support both feet of the worker.

21. The full body harness of claim 20 wherein the one or more first connecting members comprises at least one hook.

22. The full body harness of claim 20 wherein the one or more second connecting members comprises at least one closed loop formed in the second strap.

23. The full body harness of claim 20 wherein at least one of the one or more first connecting members is located at a second end of the first strap and wherein at least one of the one or more second connecting members is located in an intermediate portion of the second strap, so that the second end of the first strap is connectable to the intermediate portion of the second strap to form the single foot-supporting sling configured to support both feet of the worker.

24. The full body harness of claim 20 wherein at least one of the one or more first connecting members is located at a second end of the first strap and wherein at least one of the one or more second connecting members is located at a second end of the second strap, so that the second end of the first strap is connectable to the second end of the second strap to form the single foot-supporting sling configured to support both feet of the worker.

25. A method of using the full body harness of claim 1, comprising: releasing the first and second strap assembly components from the respective first and second housings; then, connecting the released first and second strap assembly components to each other so that the first and second strap assembly components are in the deployed position in which the first and second strap assembly components are connected to provide the single foot-supporting sling configured to support both feet of the worker.

26. The method of claim 25 wherein the method includes adjusting the deployed first and second strap assembly components to accommodate a height of the worker.

27. A full body harness comprising:

(a) a dorsal D-ring operatively connected to the harness; and (b) a suspension trauma relief strap assembly comprising:

(i) a first strap operatively connected to a first side of the harness; and (ii) a second strap operatively connected to a second, opposing side of the harness, wherein the suspension trauma relief strap assembly is configured to be in a stored position in which the first and second straps are stored in respective first and second housings, and is further configured so that the first and second straps are releasable from the respective first and second housings and thence deployable into a deployed position in which the first and second straps are connected to provide a single foot-supporting sling with a first end that is connected to the first side of the harness and with a second end that is connected to the second side of the harness, with the single foot-supporting sling being configured to support both feet of a worker to transfer weight to the D-ring;

with the proviso that the single foot-supporting sling that is provided by the connected first and second straps, and that is configured to support both feet of the worker, is the only foot-supporting sling present in the full body harness.

* * * * *